United States Patent
Harada

(10) Patent No.: US 8,002,066 B2
(45) Date of Patent: Aug. 23, 2011

(54) MOTORCYCLE FRAME CONFIGURATION

(75) Inventor: Dai Harada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 183 days.

(21) Appl. No.: 12/543,752

(22) Filed: Aug. 19, 2009

(65) Prior Publication Data

US 2010/0071985 A1    Mar. 25, 2010

(30) Foreign Application Priority Data

Sep. 24, 2008    (JP) ................. 2008-244676

(51) Int. Cl.
  *B62D 61/02*    (2006.01)
  *B62K 11/00*    (2006.01)
  *B60T 8/42*    (2006.01)
(52) U.S. Cl. ..................... 180/219; 303/115.1
(58) Field of Classification Search .......... 180/219, 180/220, 223, 227, 228, 229, 230, 231; 303/115.1, 303/115.4
See application file for complete search history.

(56) References Cited

U.S. PATENT DOCUMENTS

| 7,669,680 B2 * | 3/2010 | Hasegawa | 180/219 |
| 2007/0252430 A1 * | 11/2007 | Nishikawa et al. | 303/113.4 |
| 2008/0079310 A1 * | 4/2008 | Yamakura et al. | 303/115.4 |

FOREIGN PATENT DOCUMENTS

JP    2006-192980    7/2006

* cited by examiner

*Primary Examiner* — Anne Marie M Boehler
*Assistant Examiner* — Marc A Scharich
(74) *Attorney, Agent, or Firm* — Squire, Sanders & Dempsey (US) LLP

(57) ABSTRACT

A motorcycle includes a seat configured to support a rider, and an antilock braking modulator disposed downwardly of the seat. The antilock braking modulator is configured to control an antilock braking system (ABS). A first control valve is configured to distribute a braking force between a front wheel and a rear wheel. A second control valve is configured to introduce fuel vapors into an intake system. A first bracket is fixed on a vehicle body frame, and is mounted with the second control valve. A second bracket is supported on a side of the vehicle body frame and further supported by the first bracket and mounted with the antilock braking modulator and the first control valve.

13 Claims, 5 Drawing Sheets

MOTORCYCLE FRAME CONFIGURATION

BACKGROUND

1. Field

The present invention relates in general to motorcycles and, more particularly, to a motorcycle having an antilock braking system (ABS) modulator for controlling an ABS.

2. Description of Related Art

A known motorcycle includes a heavy ABS modulator and a heavy battery disposed centrally in juxtaposition with each other crosswise, downwardly of a seat, so as to achieve a centralized mass, (as explained, for example, in Japanese Patent Laid-Open No. 2006-192980 (Japan '980)

Despite a bracket for supporting an ABS modulator included in the motorcycle disclosed in Japan '980, no consideration is given in to a support for other auxiliaries. If an independent bracket is to be added for supporting these auxiliaries, therefore, the number of parts used increases, resulting in an increased manufacturing cost.

SUMMARY

According to an embodiment of the invention, a motorcycle includes a seat configured to support a rider, and an antilock braking modulator disposed downwardly of the seat. The antilock braking modulator is configured to control an antilock braking system (ABS). A first control valve is provided, and configured to distribute a braking force between a front wheel and a rear wheel. A second control valve is configured to introduce fuel vapors into an intake system. A first bracket is fixed on a vehicle body frame, and mounted with the second control valve. A second bracket is supported on a side of the vehicle body frame and further supported by the first bracket, and mounted with the antilock braking modulator and the first control valve.

According to another embodiment of the invention, a method of configuring a motorcycle comprises providing an antilock braking modulator, and providing a first control valve configured to distribute braking force between a front wheel and a rear wheel. A second control valve is provided, and configured to introduce fuel vapors into an intake system. The second control valve is attached to a first bracket, which is attached to a vehicle body frame. The antilock braking modulator and the first control valve are attached to a second bracket which is supported on a side of the vehicle body frame and further supported by the first bracket.

According to another embodiment of the invention, a motorcycle includes seating means for supporting a rider, and modulator means disposed downwardly of the seating means, for controlling an antilock braking system (ABS). First control means are provided, for distributing a braking force between a front wheel and a rear wheel. Second control means are provided for introducing fuel vapors into an intake system. First bracket means are fixed on a vehicle body frame. The first bracket means are for supporting the second control valve. Second bracket means are supported on a side of the vehicle body frame and further supported by the first bracket means, and are for supporting the modulating means and the first control means.

BRIEF DESCRIPTION OF THE DRAWINGS

For a better understanding of various embodiments of the claimed invention, please refer to the appended drawings wherein:

DETAILED DESCRIPTION OF THE PREFERRED EMBODIMENTS

Figure 1:
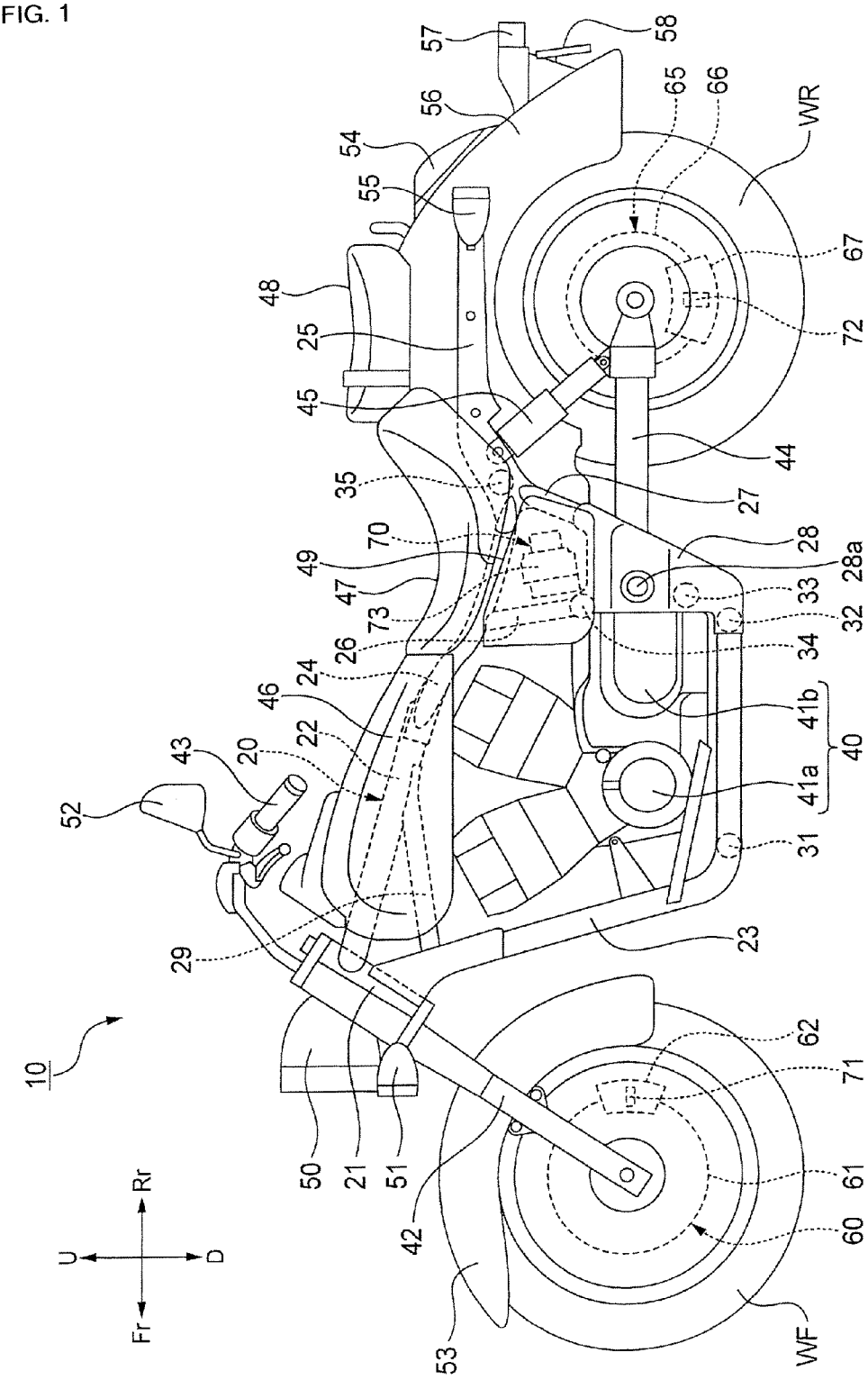
FIG. 1 is a left side elevational view showing a motorcycle according to an embodiment of the present invention.

A motorcycle according to a first embodiment of the present invention includes a first bracket that is fixed on a vehicle body frame and mounted with a second control valve, and a second bracket that is supported on a side of the vehicle body frame and further supported by the first bracket, and mounted with an antilock braking (ABS) modulator and a first control valve. These arrangements allow the first control valve and the second control valve as the auxiliaries to be supported without having to individually provide brackets for supporting the first control valve and the second control valve and suppressing an increase in the number of parts used.

According to another aspect of the present invention, the second bracket is mounted on, and supported by, the first bracket. The second bracket is therefore, after having been positioned correctly, fastened to the side of the vehicle body frame using the bolts. This improves assemblability of the ABS modulator to be mounted on the second bracket.

According to another aspect of the present invention, the ABS modulator is disposed in a space surrounded by the vehicle body frame, so that the ABS modulator can be efficiently protected.

According to another aspect of the present invention, the ABS modulator is disposed on a first side in the vehicle width direction and on an inner side in the vehicle width direction of a side cover for covering the side portion of the vehicle body frame. The ABS modulator, which is not exposed on the outside, helps improve appearance of the motorcycle. In addition, the ABS modulator, being disposed on the first side in the vehicle width direction, allows other auxiliaries to be disposed on the second side.

A motorcycle in accordance with one embodiment of the present invention will be described in detail below with reference to the accompanying drawings. The drawings should be viewed in the direction of reference numerals. Throughout the descriptions given herein, longitudinal, crosswise, and vertical directions are relative to the rider's view. In the drawings, an arrow Fr denotes a vehicle forward direction, an arrow Rr denotes a vehicle rearward direction, an arrow L denotes a vehicle leftward direction, an arrow R denotes a vehicle rightward direction, an arrow U denotes a vehicle upward direction, and an arrow D denotes a vehicle downward direction, respectively.

Referring to FIGS. 1 through 4, a motorcycle 10 according to an embodiment of the present invention has a vehicle body frame 20 that includes a head pipe 21, a main pipe 22, a pair of left and right down pipes 23, a pair of left and right center upper pipes 24, a pair of left and right rear frames 25, a pair of left and right center pipes 26, a pair of left and right rear pipes 27, a pair of left and right pivot plates 28, a sub pipe 29, a reinforcement plate 30, a first cross member 31, a second cross member 32, a third cross member 33, a fourth cross member 34, and a fifth cross member 35. Specifically, the head pipe 21 is disposed at a front end. The main pipe 22 extends rearwardly from the head pipe 21. The down pipes 23 extend downwardly and rearwardly from the head pipe 21. The center upper pipes 24 connect to a rear end portion of the main pipe 22 and extend rearwardly therefrom. The rear frames 25 connect to rear end portions of the center upper pipes 24 and extend rearwardly therefrom. The center pipes 26 connect to intermediate portions of the center upper pipes 24 and extend downwardly therefrom. The rear pipes 27 connect to front end portions of the rear frames 25 and extend downwardly therefrom. The pivot plates 28 connect rear end portions of the down pipes 23, lower end portions of the center pipes 26, and lower end portions of the rear pipes 27. The sub pipe 29 connects between a rear end portion of the main pipe 22 and front end portions of the down pipes 23. The reinforcement plate 30 connects between the rear end portion of the main pipe 22 and front end portions of the pair of left and right center upper pipes 24. The first cross member 31 connects between intermediate portions of the pair of left and right down pipes 23 in a vehicle width direction. The second cross member 32 connects between rear end portions of the pair of left and right down pipes 23 in the vehicle width direction. The third cross member 33 connects between intermediate portions of the pair of left and right pivot plates 28 in the vehicle width direction. The fourth cross member 34 connects between front upper end portions of the pair of left and right pivot plates 28 in the vehicle width direction. The fifth cross member 35 connects between front portions of the pair of left and right rear frames 25 in the vehicle width direction.

Referring to the example of FIG. 1, a power unit 40 is mounted on the pair of left and right down pipes 23 and the first, third, and fourth cross members 31, 33, 34. The power unit 40 includes, in this example, a V-type two-cylinder engine 41a and a transmission 41b. Other types of power units are within the scope of the invention.

Referring further to FIG. 1, a front fork 42 is steerably journaled on the head pipe 21. A front wheel WF is rotatably journaled on a lower end portion of the front fork 42. A steering handlebar 43 is mounted on an upper end portion of the front fork 42.

Referring again to FIG. 1, a swing arm 44 is swingably supported on the pivot plates 28 via a pivot shaft 28a. The swing arm 44 has a rear end portion on which a rear wheel WR is rotatably journaled. The swing arm 44 incorporates a built-in drive shaft and a bevel gear, both not shown, for transmitting a driving force from the transmission 41b of the power unit 40 to the rear wheel WR. In this embodiment, motorcycle 10 is driven through a shaft drive system. Referring to FIG. 1, reference numeral 45 denotes a cushion unit that suspends the swing arm 44 on the rear frame 25.

Referring to FIG. 1, the motorcycle 10 further includes a fuel tank 46, a rider seat 47, a passenger seat 48, and a side cover 49. Specifically, the fuel tank 46 is disposed upwardly of the main pipe 22. The rider seat 47 and the passenger seat 48 are disposed upwardly of the center upper pipes 24 and the rear frames 25. The side cover 49 covers a side portion between the center pipe 26 and the rear pipe 27.

Referring to FIG. 1, reference numeral 50 denotes a headlight; reference numeral 51 denotes a front turn signal lamp; reference numeral 52 denotes a rearview mirror; reference numeral 53 denotes a front fender; reference numeral 54 denotes a tail light; reference numeral 55 denotes a rear turn signal lamp; reference numeral 56 denotes a rear fender; reference numeral 57 denotes a license plate light; and reference numeral 58 denotes a license plate.

Referring to FIG. 1, a front brake device 60 for braking the front wheel WF is mounted at a lower end portion of the front fork 42. The front brake device 60 includes, for example, a front brake disc 61 and a front brake caliper 62. Specifically, the front brake disc 61 is mounted on the right side of the front wheel WF. The front brake caliper 62 is mounted at the lower end portion of the front fork 42 on the right side and is forced against both sides of the front brake disc 61 to stop the front wheel WF.

Referring also to the example of FIG. 1, a rear brake device 65 for braking the rear wheel WR is mounted at a rear end portion of the swing arm 44. The rear brake device 65 includes a rear brake disc 66 and a rear brake caliper 67. Specifically, the rear brake disc 66 is mounted on the right side of the rear wheel WR. The rear brake caliper 67 is mounted at a lower end portion of an arm on the right side of the swing arm 44 and is forced against both sides of the rear brake disc 66 to stop the rear wheel WR.

The motorcycle 10 according to an embodiment of the present invention is mounted with an operative connection brake system not shown and an anti-lock brake system 70 (hereinafter referred to simply as the "ABS 70"). Specifically, the operative connection brake system provides an operative connection between the front brake device 60 and the rear brake device 65. The ABS 70 electrically controls hydraulic pressure of the operative connection brake system to circumvent lockup of the front wheel WF and the rear wheel WR.

Referring to FIG. 1, the ABS 70 can include a front wheel side speed sensor 71, a rear wheel side speed sensor 72, a control unit not shown, and an ABS modulator 73. Specifically, the front wheel side speed sensor 71 is disposed on a backside of the front brake caliper 62 and detects the speed of the front wheel WF. The rear wheel side speed sensor 72 is disposed on a backside of the rear brake caliper 67 and detects the speed of the rear wheel WR. The control unit determines a slip condition during braking based on speed signals from the front wheel side speed sensor 71 and the rear wheel side speed sensor 72 and transmits a control signal to the ABS modulator 73 to be described later to maintain an appropriate slip ratio. The ABS modulator 73 increases or decreases the hydraulic pressure of the front brake caliper 62 and the rear brake caliper 67 as necessary based on the control signal from the control unit.

The ABS modulator 73 can be a single assembly including an electric motor, a hydraulic pump driven by the electric motor, a plurality of hydraulic pipes connected to the hydraulic pump, and solenoid valves and other parts disposed midway the hydraulic pipes. In accordance with an embodiment of the present invention, the ABS modulator 73 is supported by a first bracket 80 and a second bracket 90, the first bracket 80 being mounted on the vehicle body frame 20 and the second bracket 90 being supported on a side of the vehicle body frame 20 and further supported by the first bracket 80, as shown in FIGS. 2 through 4.

Figure 3:
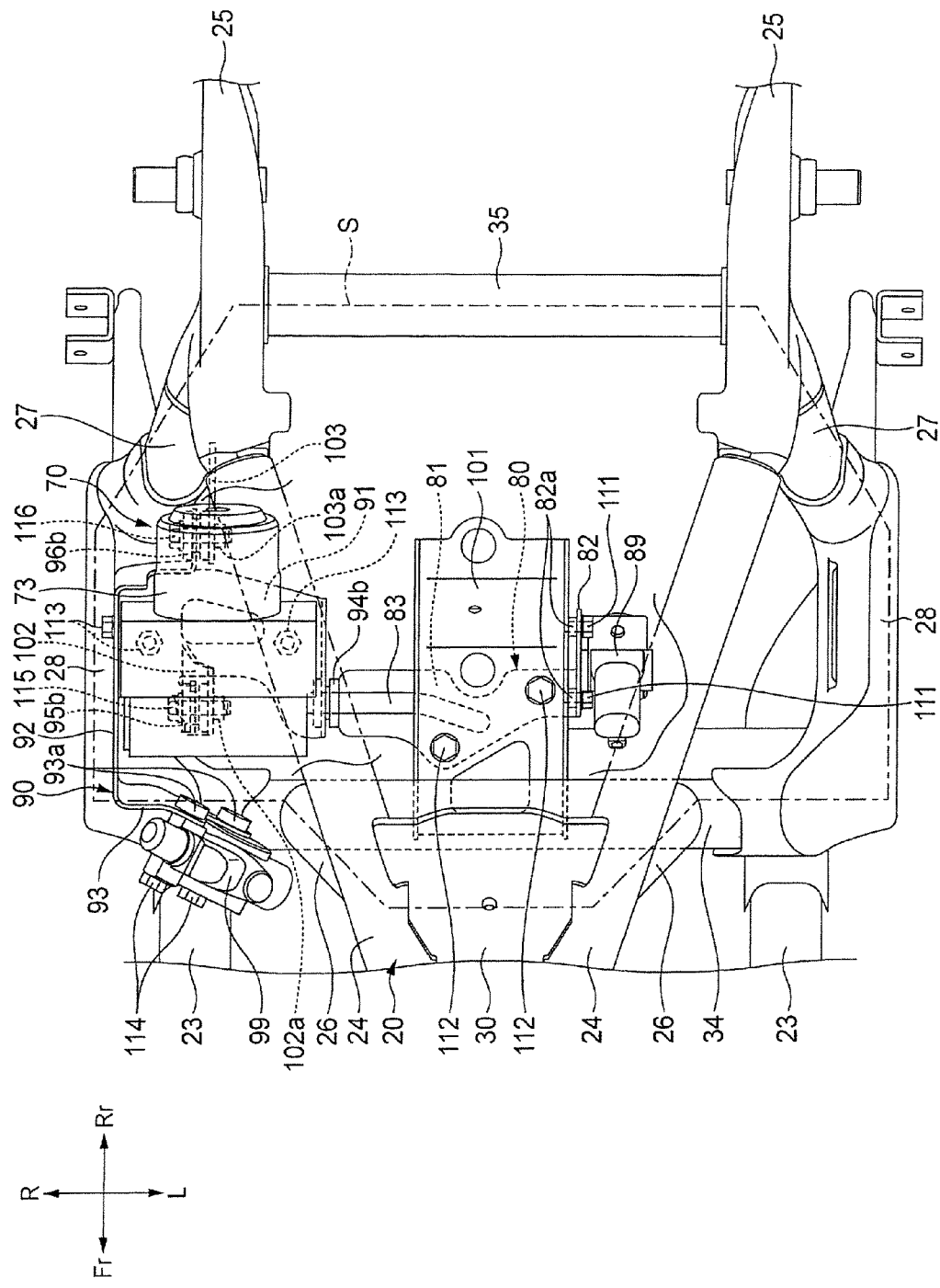
FIG. 3 is an enlarged plan view showing parts around the ABS modulator shown in FIG. 2.
Figure 4:
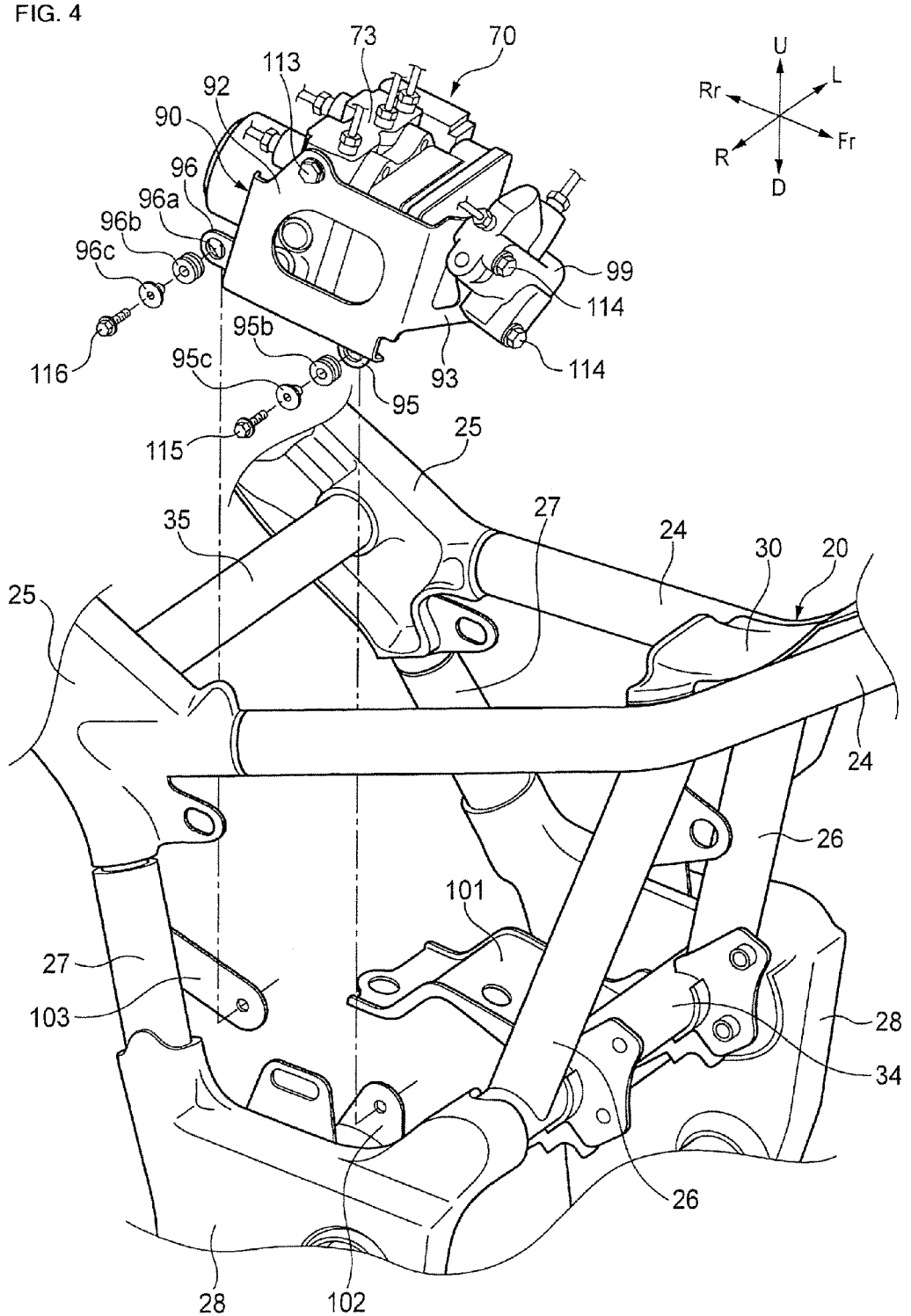
FIG. 4 is an enlarged perspective view showing principal parts of a vehicle body frame with the ABS modulator removed.
Figure 5:
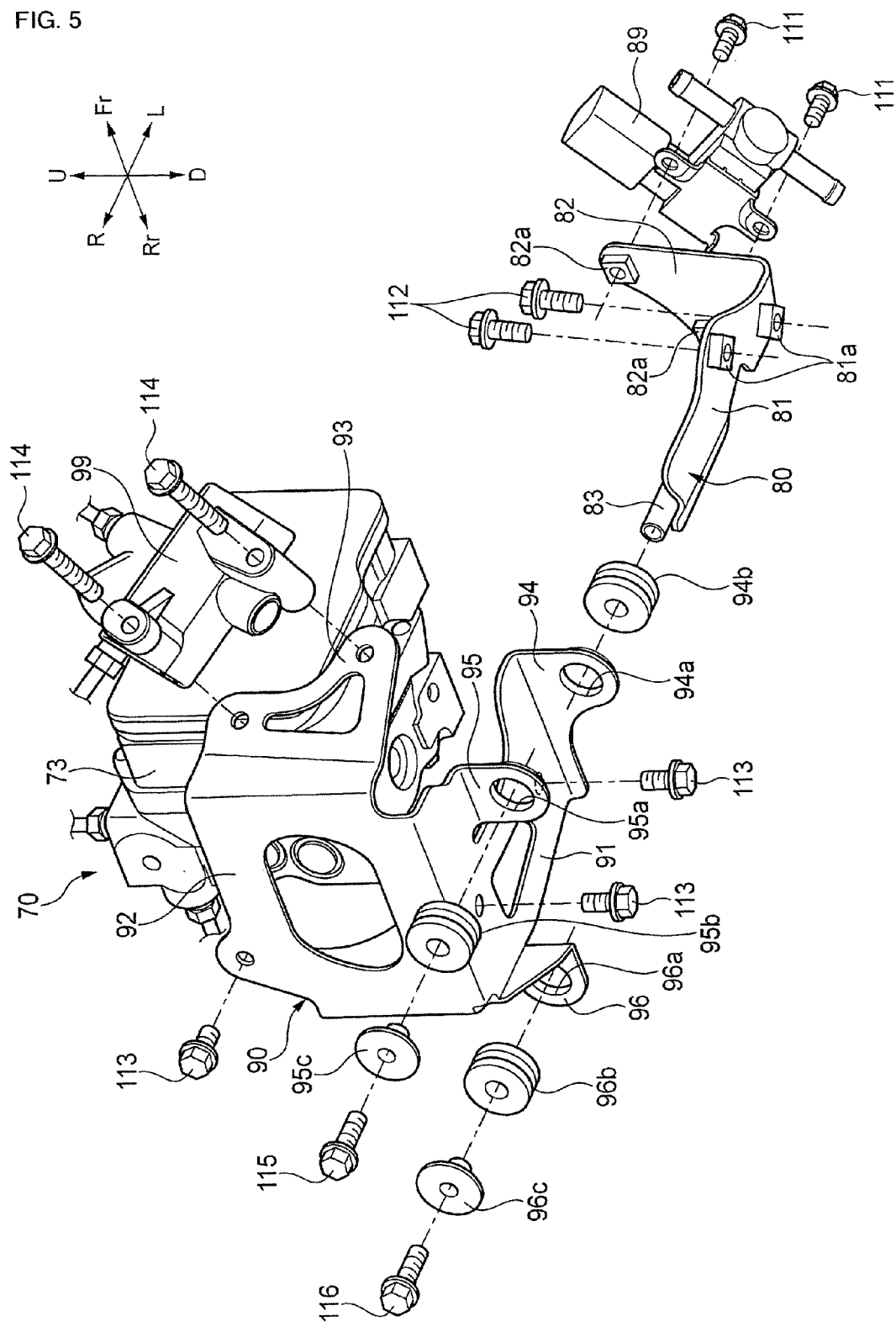
FIG. 5 is an exploded perspective view showing the ABS modulator, a PCV, a PCSV, a first bracket, and a second bracket shown in FIG. 3.

Referring to FIGS. 3 and 5, the first bracket 80 includes a flat plate portion 81, a mounting stay 82, and a support pipe 83. Specifically, the mounting stay 82 extends upwardly from the left side in the vehicle width direction of the flat plate portion 81. The support pipe 83 disposed on the right side in the vehicle width direction of the flat plate portion 81 supports the inner side in the vehicle width direction of the second bracket 90.

Figure 2:
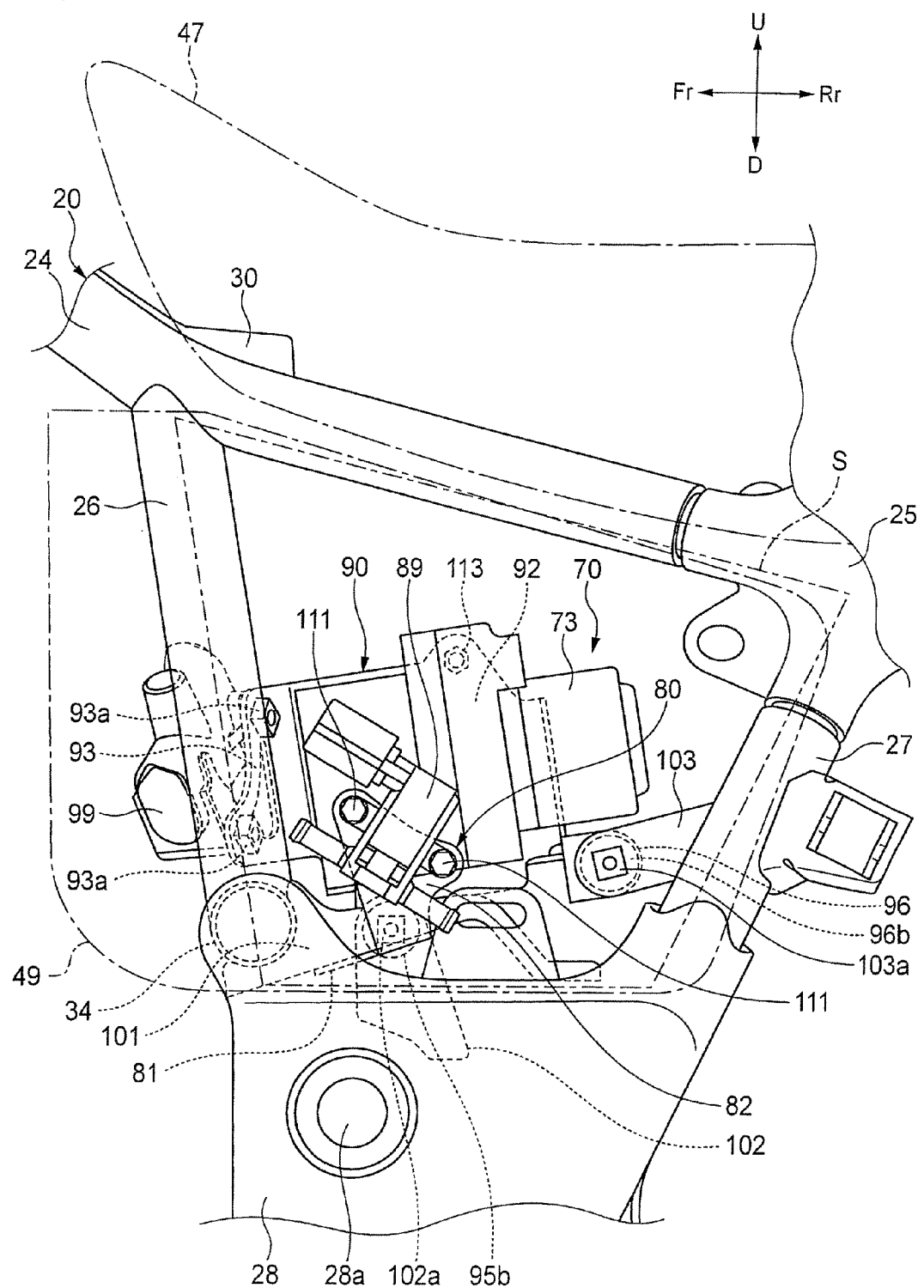
FIG. 2 is an enlarged left side elevational view showing parts around an ABS modulator shown in FIG. 1.

Referring to FIGS. 2 and 5, in accordance with the embodiment of the present invention, a purge control solenoid valve 89 (hereinafter referred to simply as the "PCSV 89") is fastened to an outer side surface of the mounting stay 82 using two bolts 111. The PCSV 89 serves as a second control valve that draws fuel vapors from a canister and introduces the fuel vapors into an intake system. Note that each of the bolts 111 is screwed from the leftward direction into a weld nut 82a that is to be fixed on an inner surface of the mounting stay 82.

Referring to FIGS. 3 and 5, the first bracket 80 mounted with the PCSV 89 is fastened to a bottom surface of a first support stay 101 that is welded to the fourth cross member 34 of the vehicle body frame 20 and extends rearwardly using two bolts 112. Note that each of the bolts 112 is screwed from the upward direction into a weld nut 81a that is to be fixed on a bottom surface of the flat plate portion 81.

Referring to FIGS. 2 through 5, this example of second bracket 90 is formed from a single sheet member. The second bracket 90 includes a flat plate portion 91, a side plate portion 92, a mounting stay 93, an inner support flap 94, an outer support flap 95, and an outer support flap 96. Specifically, the side plate portion 92 extends upwardly from the right side in the vehicle width direction of the flat plate portion 91. The mounting stay 93 extends inwardly in the vehicle width direction and then forwardly from the leading end side of the side plate portion 92. The inner support flap 94 extends downwardly from the left side in the vehicle width direction of the flat plate portion 91. The outer support flap 95 extends downwardly from a front portion at a substantial center in the vehicle width direction of the flat plate portion 91. The outer support flap 96 extends inwardly in the vehicle width direction and then rearwardly from the trailing end side of the side plate portion 92.

Referring again to FIGS. 2 through 5, in an embodiment of the present invention, the ABS modulator 73 is fastened to an upper surface of the flat plate portion 91 and an outer side surface of the side plate portion 92 using three bolts 113. Note that the bolts 113 are screwed into internal threads not shown formed in a bottom portion and a right side portion of the ABS modulator 73 from the downward or rightward direction.

In this example, a proportional control valve 99 (hereinafter referred to simply as the "PCV 99") is fastened to an outer side surface of the mounting stay 93 using two bolts 114. The PCV 99 serves as a first control valve that forms part of the ABS 70 and distributes the hydraulic pressure between the front brake device 60 and the rear brake device 65. Note that each of the bolts 114 is screwed from the rearward direction into a weld nut 93a that is to be fixed on an inner surface of the mounting stay 93.

As shown in FIGS. 3 through 5, the second bracket 90 mounted with the ABS modulator 73 and the PCV 99 is mounted on, and supported by, the first bracket 80 by fitting a rubber bushing 94b mounted in a fit hole 94a in the inner support flap 94 onto the support pipe 83 of the first bracket 80. This correctly positions the second bracket 90 relative to the vehicle body frame 20.

In addition, the second bracket 90 is fastened to, and supported by, a second support stay 102 by fastening, using a bolt 115, a rubber bushing 95b and a collar 95c fitted in a fit hole 95a in the outer support flap 95 onto an outer side surface of the second support stay 102. Support stay 102 that is welded to an inner side of the pivot plate 28 of the vehicle body frame 20 and extends upwardly. Note that the bolt 115 is screwed from the rightward direction into a weld nut 102a that is to be fixed on an inner surface of the second support stay 102.

Further, the second bracket 90 is fastened to, and supported by, a third support stay 103 by fastening, using a bolt 116, a rubber bushing 96b and a collar 96c fitted in a fit hole 96a in the outer support flap 96 onto an outer side surface of the third support stay 103. Support stay 103 is welded to an inner side of the right rear pipe 27 of the vehicle body frame 20 and extends forwardly. Note that the bolt 116 is screwed from the rightward direction into a weld nut 103a that is to be fixed on an inner surface of the third support stay 103.

Referring to FIGS. 2 through 4, in the example of motorcycle 10 having the configuration described above, the ABS modulator 73 is disposed in a space S that is downward of the rider seat 47 and surrounded by the center upper pipes 24, the rear frames 25, the center pipes 26, the rear pipes 27, the pivot plates 28, the reinforcement plate 30, the fourth cross member 34, and the fifth cross member 35 of the vehicle body frame 20. Further, the ABS modulator 73 is disposed in the space S on the right side in the vehicle width direction opposite a side stand and on the inner side in the vehicle width direction of the side cover 49. This facilitates servicing of the ABS modulator 73 and improves weight balance of the motorcycle 10.

The second bracket 90 is supported on the vehicle body frame 20 at a total of three points; specifically, one point of the second bracket 90 on the inner side in the vehicle width direction is fitted to, and supported by, the support pipe 83 of the first bracket 80 mounted on the fourth cross member 34 and two points of the second bracket 90 on the outer side in the vehicle width direction are fastened to, and supported by, the second support stay 102 mounted on the pivot plate 28 and the third support stay 103 mounted on the rear pipe 27, respectively.

The motorcycle 10, in accordance with an embodiment of the present invention as described heretofore includes the first bracket 80, which is fixed to the fourth cross member 34 via the first support stay 101 and mounted with the PCSV 89. Second bracket 90, which is supported by the support pipe 83 of the first bracket 80, is fixed to the second support stay 102 on the pivot plate 28 and the third support stay 103 on the rear pipe 27, and mounted with the ABS modulator 73 and the PCV 99. These arrangements allow the PCV 99 and the PCSV 89 as auxiliaries to be supported without having individual brackets for supporting the PCV 99 and the PCSV 89 and thereby suppressing an increase in the number of parts used.

In this example of motorcycle 10, the second bracket 90 is mounted on, and supported by, the support pipe 83 of the first bracket 80. Accordingly, after the second bracket 90 is positioned, the second bracket 90 is fastened to, and supported by, the second support stay 102 on the pivot plate 28 and the third support stay 103 on the rear pipe 27 using the bolts 115, 116. This improves assemblability of the ABS modulator 73 to be mounted on the second bracket 90.

In this example of motorcycle 10, the ABS modulator 73 is disposed in the space S that is surrounded by the center upper pipes 24, the rear frames 25, the center pipes 26, the rear pipes 27, the pivot plates 28, the reinforcement plate 30, the fourth cross member 34, and the fifth cross member 35 of the vehicle body frame 20. The ABS modulator 73 can thereby be efficiently protected.

The ABS modulator 73 is disposed on the right side in the vehicle width direction and on the inner side in the vehicle width direction of the side cover 49. The ABS modulator 73 is not therefore exposed to the outside, which results in improved appearance of the motorcycle 10. In addition, the ABS modulator 73 being disposed on the right side in the vehicle width direction allows other auxiliaries to be disposed on the left side in the vehicle width direction.

The above embodiments and details of the invention are merely examples; modifications and changes to various elements can be made, will still remaining within the spirit and scope of the invention. For proper understanding of the metes and bounds of the invention, reference should be made to the appended claims.

DESCRIPTION OF REFERENCE SYMBOLS

10: Motorcycle
20: Vehicle body frame

24: Center upper pipe
25: Rear frame
26: Center pipe
27: Rear pipe
28: Pivot plate
30: Reinforcement plate
34: Fourth cross member
35: Fifth cross member
47: Rider seat
49: Side cover
60: Front brake device
65: Rear brake device
70: Anti-lock brake system (ABS)
71: Front wheel side speed sensor
72: Rear wheel side speed sensor
73: ABS modulator
80: First bracket
83: Support pipe
89: Purge control solenoid valve (PCSV, second control valve)
90: Second bracket
99: Proportional control valve (PCV, first control valve)
101: First support stay
102: Second support stay
103: Third support stay
112: Bolt
115: Bolt
116: Bolt
S: Space

I claim:

1. A motorcycle, comprising:
a seat configured to support a rider;
an antilock braking modulator disposed downwardly of the seat, the antilock braking modulator configured to control an antilock braking system (ABS);
a first control valve configured to distribute a braking force between a front wheel and a rear wheel;
a second control valve configured to introduce fuel vapors into an intake system;
a first bracket fixed on a vehicle body frame and mounted with the second control valve; and
a second bracket supported on a side of the vehicle body frame and further supported by the first bracket, the second bracket mounted with the antilock braking modulator and the first control valve.

2. The motorcycle according to claim 1, wherein:
the second bracket is supported at a plurality of points on the side of the vehicle body frame;
at least one point of the second bracket on an inner side in a vehicle width direction is fitted to the first bracket; and wherein
at least another point of the second bracket on an outer side in the vehicle width direction is fastened to the vehicle body frame.

3. The motorcycle according to claim 2, wherein the another point of the second bracket is fastened to the vehicle body frame by a bolt.

4. The motorcycle according to claim 1, wherein the antilock braking modulator is surrounded by the vehicle body frame.

5. The motorcycle according to claim 1, further comprising:
a side cover for covering a side portion of the vehicle body frame,
wherein the antilock braking modulator is disposed on an inner side of the side cover in a vehicle width direction.

6. The motorcycle according to claim 1, wherein said second bracket is fixed to the vehicle body frame.

7. A method of configuring a motorcycle, said method comprising:
providing an antilock braking modulator;
providing a first control valve configured to distribute braking force between a front wheel and a rear wheel;
providing a second control valve configured to introduce fuel vapors into an intake system;
attaching the second control valve to a first bracket attached to a vehicle body frame; and
attaching the antilock braking modulator and the first control valve to a second bracket supported on a side of the vehicle body frame and further supported by the first bracket.

8. A method of configuring a motorcycle according to claim 7, further comprising:
supporting the second bracket at a plurality of points on the side of the vehicle body frame; and
attaching at least one point of the second bracket on an inner side in a vehicle width direction to the first bracket; and
attaching at least another point of the second bracket on an outer side in the vehicle width direction to the vehicle body frame.

9. A method of configuring a motorcycle according to claim 8, wherein the attaching of the second bracket comprises attaching the second bracket to the vehicle body frame by a bolt.

10. A method of configuring a motorcycle according to claim 7, further comprising:
attaching a side cover for covering a side portion of the vehicle body frame,
wherein the attaching of the antilock braking modulator comprises attaching the antilock braking modulator such that it is disposed on an inner side of the side cover in a vehicle width direction.

11. A method of configuring a motorcycle according to claim 7, wherein the attaching of the antilock braking modulator comprises attaching the antilock braking modulator such that it is surrounded by the vehicle body frame.

12. A motorcycle, comprising:
seating means for supporting a rider;
modulator means disposed downwardly of the seating means, the modulator means for controlling an antilock braking system (ABS);
first control means for distributing a braking force between a front wheel and a rear wheel;
second control means for introducing fuel vapors into an intake system;
first bracket means disposed on a vehicle body frame, said first bracket means for supporting the second control means; and
second bracket means supported on a side of the vehicle body frame and further supported by the first bracket means, said second bracket means for supporting the modulator means and the first control means.

13. The motorcycle according to claim 12, wherein said second bracket means is fixed to the vehicle body frame.

* * * * *